(12) United States Patent
Ligertwood

(10) Patent No.: US 7,334,766 B2
(45) Date of Patent: Feb. 26, 2008

(54) PANEL MOUNTING UNIT

(76) Inventor: Peter Ligertwood, Unicol Engineering, Green Road, Headington, Oxford OX3 8EU (GB)

( * ) Notice: Subject to any disclaimer, the term of this patent is extended or adjusted under 35 U.S.C. 154(b) by 297 days.

(21) Appl. No.: 11/046,402

(22) Filed: Jan. 28, 2005

(65) Prior Publication Data

US 2005/0167549 A1 Aug. 4, 2005

(30) Foreign Application Priority Data

Jan. 30, 2004 (GB) ................. 0401995.6

(51) Int. Cl.
E04G 3/00 (2006.01)
(52) U.S. Cl. ................ 248/292.13; 248/201; 248/299.1
(58) Field of Classification Search ................ 248/121, 248/126, 919, 922–923, 201, 284.1, 291.1, 248/276.1, 292.14, 299.1; D8/363, 373, D8/355; D14/451
See application file for complete search history.

(56) References Cited

U.S. PATENT DOCUMENTS 6,604,722 B1 * 8/2003 Tan .......................... 248/276.1
6,964,399 B1 * 11/2005 O'Neill .................. 248/292.13
7,152,836 B2 * 12/2006 Pfister et al. ........... 248/292.14
2003/0201372 A1 * 10/2003 Dozier ..................... 248/286.1
2006/0006296 A1 * 1/2006 Morita ....................... 248/200

FOREIGN PATENT DOCUMENTS

GB 2376557 12/2002

* cited by examiner

Primary Examiner—Gwendolyn Baxter
(74) Attorney, Agent, or Firm—Davis Bujold & Daniels, P.L.L.C.

(57) ABSTRACT

A display panel mounting unit comprising a mounting plate and at least two mounting supports. The mounting plate includes first and second support flanges having a longitudinal first member for attachment to a display panel; and a longitudinal second member attached to the first member by a pivot to provide an axis of rotation of the second member relative to the first member. The second member having a first arm on one side of the pivot and a second arm on the other side of the pivot; the first arm having an anchorage at an end remote from the pivot and a first means for retaining the mounting support on the first support flange. The second arm having, at an end remote from the pivot, a second means for retaining the mounting support on the second support flange and a compression member extends between the first member and the anchorage and resiliently biases the anchorage away from the first member.

7 Claims, 6 Drawing Sheets

PANEL MOUNTING UNIT

This invention relates to a panel mounting unit and for a combination there of with a unit. It is particularly concerned with a unit whereby a display panel can be mounted on a surface or other supporting means.

It is known to mount an electronic information display panel on a wall or other support to provide for ready viewing of the panel. Such a panel has an active display component which can be, for example, a plasma panel, light emitting diodes or liquid crystal display. A display panel of this type is characterised by having width and vertical depth dimensions which are considerably greater than the thickness of the panel. The width and depth dimensions of modern panels can be of the order of several hundreds of millimeters. The panel can be positioned to operate in a portrait or landscape configuration. The panel itself can be heavy and this, taken in combination with its size, can make it difficult to manipulate during installation. A security requirement can arise since a display panel is an expensive item liable to theft or tampering.

According to a first aspect of the present invention there is provided a display panel mounting unit comprising a mounting plate and at least two mounting supports;

the mounting plate, providing for the attachment of the unit to a wall or other support; the mounting plate including first and second attachment means to which the mounting supports are attached;

each, mounting support comprising a first longitudinal member incorporating means whereby the member can be attached to a display panel for mounting; and a second longitudinal member pivotably attached to the first by means of a pivot so as to provide an axis of rotation of the second member relative to the first member; the second member comprising a first arm on one side of the pivot and a second arm on the other side of the pivot; the first arm having at, or near, an end remote from the pivot an anchorage and a first means for retaining the mounting support on the first attachment means on the mounting plate; the second arm having at, or near, an end remote from the pivot a second means for retaining the mounting support on the second attachment means on the mounting plate; a compression means extending between a location on the first member and the anchorage of the second member; the compression means serving to resiliently bias the anchorage, and so the end of the second arm remote from the pivot, away from the location on the first member; the compression means providing that with a combination comprising a display panel secured to the first longitudinal member an the combination attached to the second member by way of the pivot and the second member clamped to the mounting plate then a first moment generated by the weight of the combination about the pivot axis in a given direction of rotation is balanced by a second moment generated by the action of the compression means on the first arm about the pivot axis in the opposite direction to the given direction.

According to a first preferred version of the first aspect of the present invention the means whereby the first longitudinal member can be attached to a display panel for mounting comprise at least one longitudinal slot in the first longitudinal member. Typically the, or each, slot is provided with an associated clip mounting by means of which a bolt can be positioned in a predetermined location in the slot.

Preferably the slot is provided with a series of recesses at intervals along its length and the associated clip is provided with a projection whereby the clip can engage with a selected recess in the series to locate the clip at a predetermined position in the slot relative to a display panel for mounting on the first member.

According to a second preferred version of the first aspect of the present invention or of any preceding preferred version thereof the unit includes means whereby the first member can be displaced about the axis of rotation relative to the second member by means operable remotely from the unit.

According to a second aspect of the present invention there is provided an assembly comprising in combination a display panel and a display panel mounting unit according to the first aspect or of any preferred version thereof.

According to a first preferred version of the second aspect of the present invention means are provided whereby the first member can be displaced about the axis of rotation relative to the second member by means operable remotely from the unit.

An exemplary embodiment of the invention will now be described with reference to the accompanying drawings of a panel mounting device of which:

FIG. 1 perspective view from the front;

Figure 1:
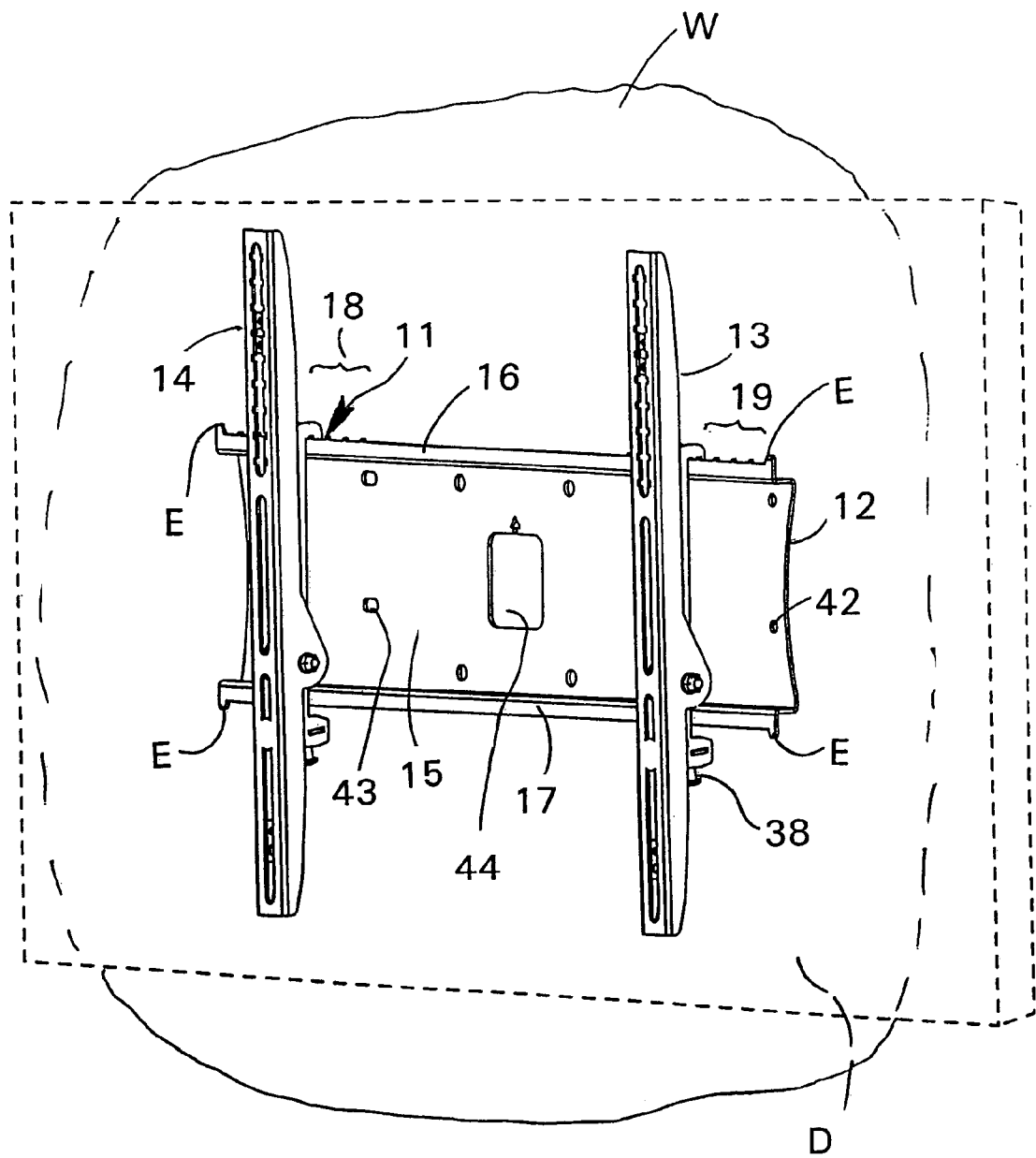
Figure 2:
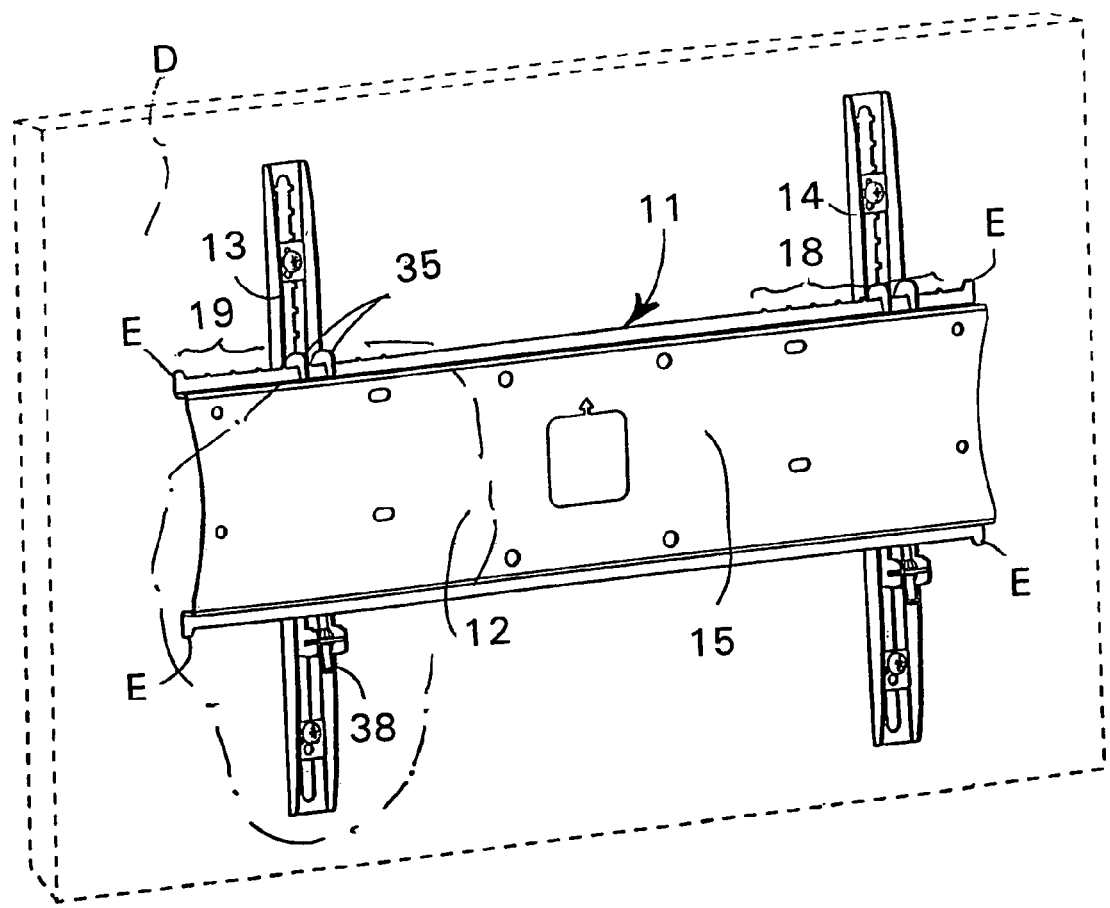
FIG. 2 is perspective view from the rear.

The figures variously show a panel mounting device 11 comprising a mounting plate 12 and, in this case, two mounting supports 13, 14. A display panel D is shown in broken outline. The mounting plate 12 provides for the attachment of the device 11 to a wall W. The plate 12 has a body section 15 with two attachment means comprising a projecting L-shaped upper support flange 16 and an L-shaped lower support flange 17. The upper flange 16 is provided towards either end region with a series of projections 18, 19, for location purposes as will be described hereafter, and with end stops E.

The mounting supports 13, 14 are identical in form, components and function and so hereafter detailed reference will only be made to support 13.

FIGS. 3 to 6 variously show a support 13 comprising a first longitudinal member 20, of channel section, for securing to the rear of the display panel D (shown in broken outline) selected from a variety of panels available from a number of manufacturers. To this end the first member 20 is provided with a universal fitting providing for the accommodation of a variety of panels comprising;

first slot 21 with associated first mounting clip 22, a second slot 23 with associated second mounting clip 24; and central slot C1 for a centre mounting means, such as a bolt, for a panel.

First slot 21 is provided with a series of punched pairs of lateral slots, typically slot 25, into a selected one of which projecting lugs 26 of first mounting clip 22 can be inserted. The first clip 22 is provided with holes 27 through which bolt B is placed to engage with to a complementary threaded socket in the panel D so enabling the first member 20 to be clamped to the upper part of the panel D.

Figure 3A:
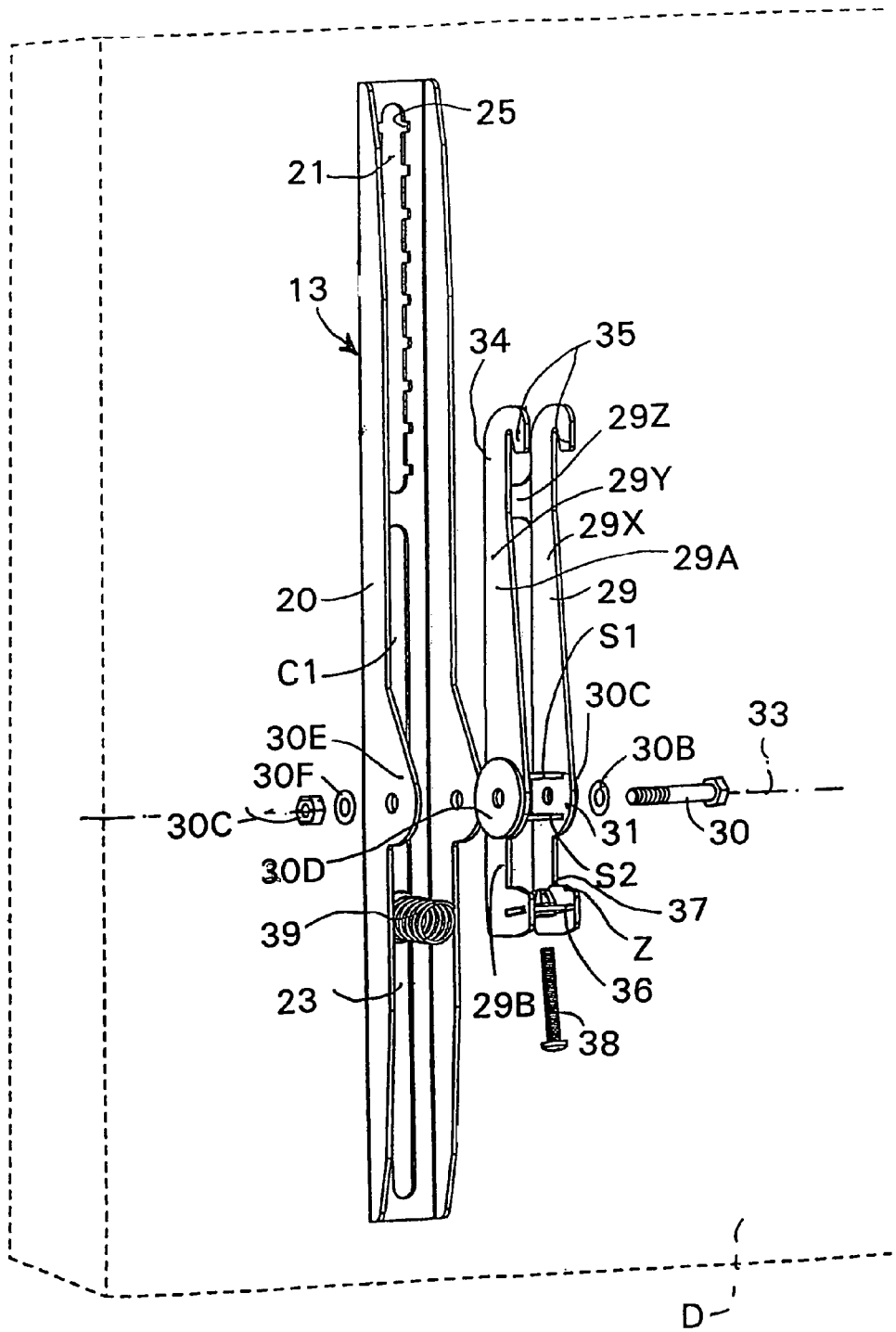
FIG. 3A is an exploded view of a component of FIG. 2.
Figure 3B:
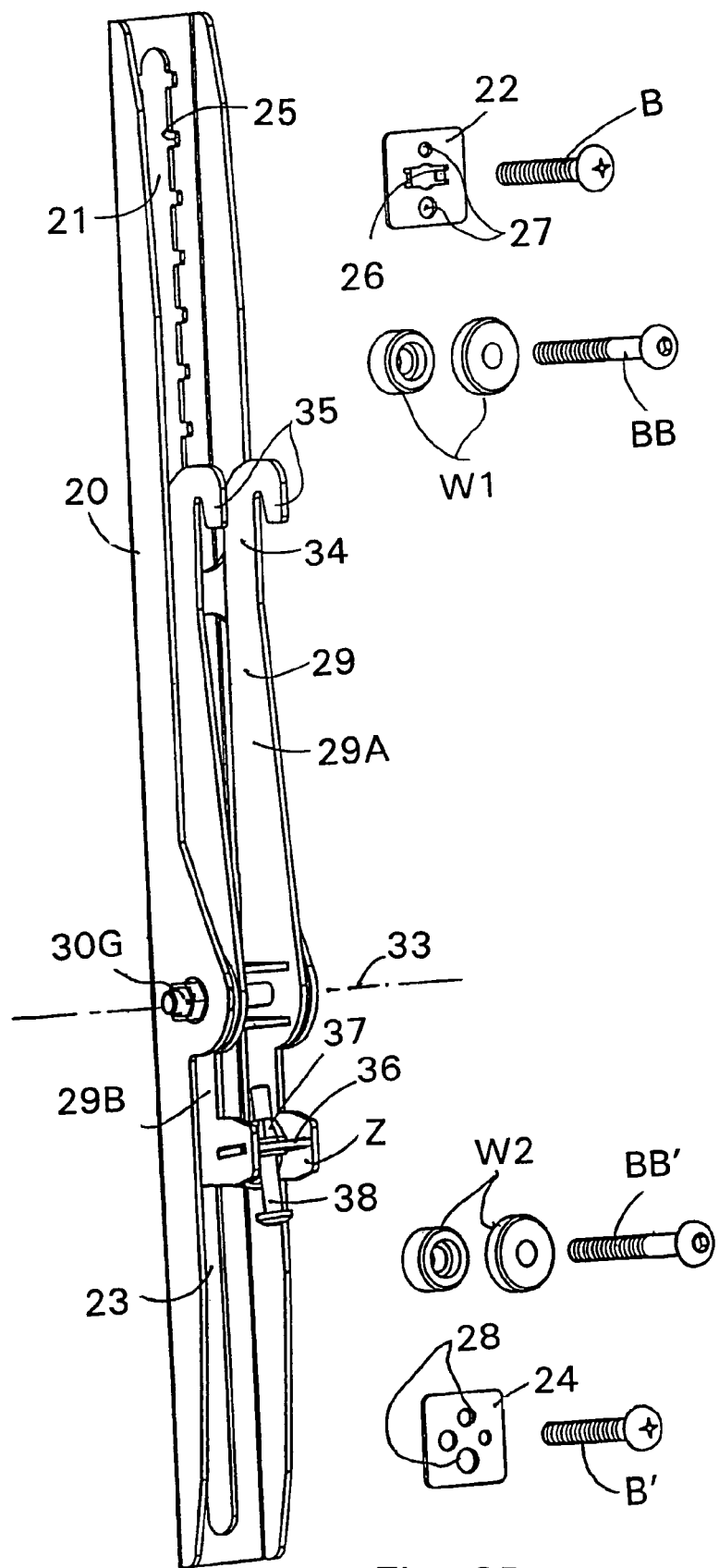
FIG. 3B is an assembled view of the components shown in FIG. 3A with additional components.

As shown particularly in FIG. 3B second slot 23 is un-slotted by comparison with first slot 21 to provide an infinitely variable location for a bolt B' located in the slot 23 by means of second clip 24 relative to bolt B in a fixed location in slot 21. Second clip 24 is provided with holes 28 through which a bolt is placed in order to secure the clip 24 to a complementary threaded recess in the panel D and so enabling the first member 20 to be clamped to the lower part of the panel D.

In the event that a panel D is to be mounted so as to be electrically isolated from first member 20, and so from the whole unit 11, a bush W1 of insulating material is located in slot 21 and/or C1 as appropriate so that bolt BB extends through the W1 into the panel D. Likewise bush W2 of insulating material is located in slot 23, and/or C1, as appropriate so that bolt BB' extends through the W1 into the panel D.

In this way loading applied by means of the bolt to clamp the first member 13 to is solely by way of the insulating bushes W1, W2 as aforesaid.

Second longitudinal member 29 is of channel section with side walls 29X, 29Y, and base 29Z. The second member 29 is pivotably attached to the first member 20 by means of a bolt 30 located in trunnions 31, 32 formed integrally with first member 20. The bolt 30 provides for a pivot axis of rotation 33 of the second member 29 relative to the first member 20.

With particular reference to FIG. 3A a pivot bolt 30 extends through Bellville washer 30B, trunnion 31, nylon washer 30C, through second member 29, nylon washer 30D, trunnions 30E, Belleville washer 30F finally engaging with nut 30G. On assembly of the support member 13 it is necessary to tighten up the bolt 30A to provide the appropriate loading to ensure the second member 29 pivots smoothly. To ensure that the loading does not distort the second member 29 in the vicinity of pivot axis 33 of bolt 30 the second member 29 has two integral stiffeners S1, S2 extending between walls 29X, 29Y of the channel from which the member 29 is formed. The stiffeners S1, S2 are formed by bending cut-outs formed in the base 29Z of the channel.

The second member 29 extends longitudinally on either side of the bolt 30 to provide a first arm 29A above the bolt 30 and a second arm 29B below the bolt 30. The first arm 29A has near an end 34 remote from the bolt 30 a pair of hooks 35 providing for the retention of the support arm 13 on the upper flange 16 of the mounting plate 12.

The second arm 29B towards end Z remote from the axis 33 includes an anchorage 36 in which is mounted a bush 37 through which bolt 38 extends to provide a lower means for clamping the second member 29 to flange 17 on the mounting plate 12 by way of the bolt 38. The anchorage 36 is not at right angles to base 29Z of the channel but is canted so that the leading end of the bolt 38 when bolt 38 is tightened to engage a flange 17 on mounting plate 12 tends to draw the second member 29 into closer engagement with the mounting plate flange.

Compression spring 39 extends between a location 40 on the first member 20 and the anchorage 36. The compression spring 28 acts to resiliently bias the anchorage 36, and so the end Z of the second arm 29B, away from the first member 20.

The first arm 29A is longer than the second arm 29B so that rotation of the end 29B has a reasonable arc of travel into and out of the channel section of first member 20 when the second member 29 is pivoting about axis 33 relative to first member 20. A greater arc of movement can be achieved as will be referred to later.

The compression spring 39 together with a corresponding spring in the support arm 14 have a combined spring rate such that the weight of the combination of the second member 29 and panel D provide a moment tending to pivot the combination in a first direction about the pivot axis 33. This is balanced by a second moment generated by the action of the compression spring 39 on the anchorage 36 of the about the pivot axis 33 in the opposite direction to the given direction. Thus regardless of the position of combination relative to the axis 33 the combination is not subject to a significant rotary displacement and tends to remain in a position in which it is left. The range of angular rotation available in this case is about 11 degrees. The combination is readily moved throughout this range with a smooth and light movement.

To provide for the mounting of display panel D on wall W (see FIG. 1) the plate 12 is secured to the wall W by conventional means. To facilitate this the body section 15 of the plate 12 is fabricated with several holes and slots, typically hole 42 and slot 43, through which a retaining device can be driven. A central aperture 44 enable a power supply and data cable to be fed to the panel from a wall source so that the cable is concealed from view and to some extent protected against tampering.

The supports 13, 14 are then mounted, by way of their respective first longitudinal members, on the panel D and secured in place as described earlier.

Thereafter the combination of panel D and supports 13 and 14 are presented to the plate 12 and the pair of hooks 35 on arm 29A and the corresponding pair of hooks on support 14 are hooked over upper flange 16 to seat symmetrically relative to the plate 12. The hooks 35 are seated so that they are juxtaposed with projections in sequence 19 to limit sliding of the combination relative to the plate 12. 18 and to provide for the D to be laterally mounted symmetrically on the plate 12. This initial hooking over step is readily achieved even with limited or unstable access only being available to the operator.

Figure 4:
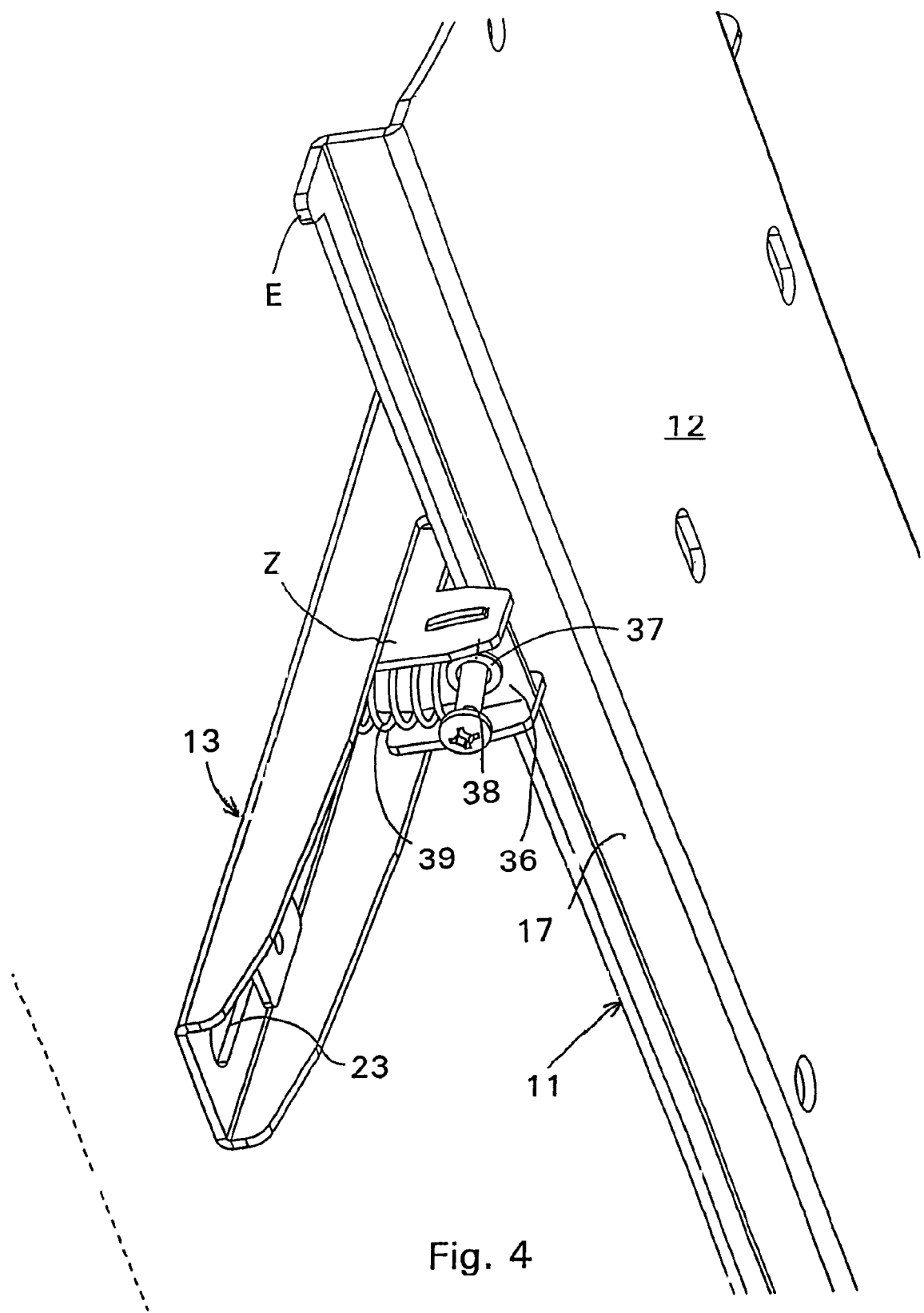
FIG. 4 is an enlarged detail of FIG. 3B.
Figure 5:
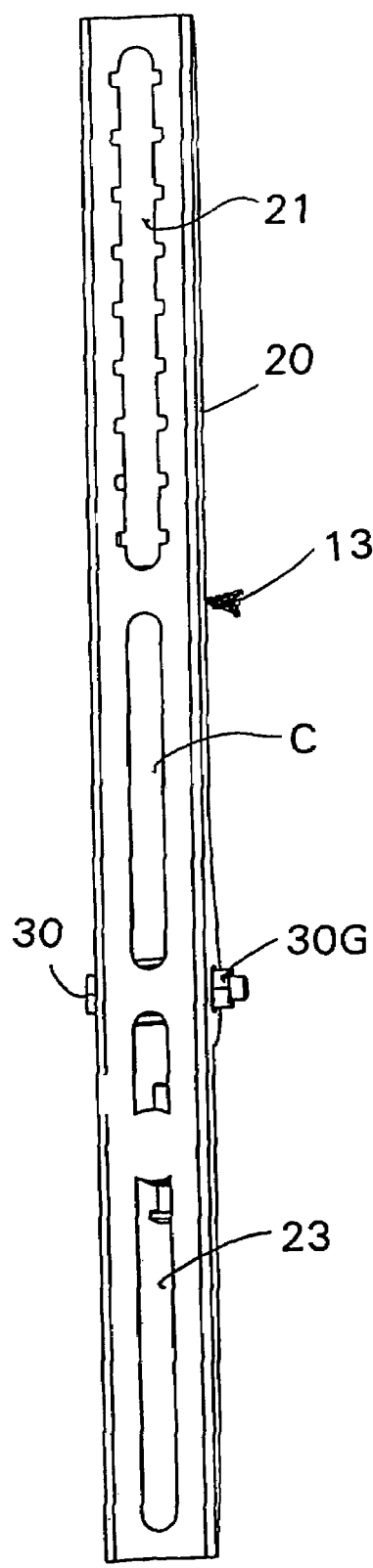
FIG. 5 is a further view of a component shown in FIGS. 3A and 3B.

The combination of panel D and support members 13, 14 is then finally secured in place on plate 12 by tightening up bolt 38 on support 13, and the corresponding bolt on support 14, so that the lower part of each support 13, 14 is clamped against lower flange 17 of the plate 12. The angled alignment of the bolt 38 ensures that as the bolt is tightened it tends to move into the apex of the flange 17 so tending to draw the second member 29 (and the corresponding member of support 14 more closely to the plate 12. FIG. 4 shows the relative positions of components in the lower part of support member 13 once the bolting operation is completed. In this figure the wall W is not shown for the sake of clarity.

To combat unauthorized removal or tampering the shape of the flanges 16, 17 and their interaction with hooks 35 and bolt 38 on support 13 and the corresponding elements on support 14 serve to prevent the combination of support 13, 14 and panel D from being readily directly away from the wall W.

The end stops E, quite apart from the sequence of projections 18, 19, serve to resist attempts to slide the panel D and support members 13, 14 laterally from the plate 12.

The exemplary embodiment describes a system for mounting a display panel D which while secured in location can be readily rotated about axis 33 over an arc until a selected viewing position is reached when the panel D can be released whereupon it remains in place.

In the event the display panel is mounted in a location to which limited access is available in order to manipulate the screen to a different viewing angle then a cable can be provided with one end attached to the screen and the other end located so that the cable can be used to pivot the screen to the required viewing angle.

In the exemplary embodiment the pivot axis 33 lies relatively close to the base of the channel forming first member 20. As a result the angular displacement available of the member 29 about pivot axis 33 is limited. In the event a greater arc of travel is required then the pivot axis 33 can be moved outwardly away from the first member 20 by having trunnions 31, 32 of greater depth so that the holes in the trunnions through which bolt 30 passes are further away from the base of the channel forming first member 20. In this way the outboard end of arm 29B has a greater arc of movement and to the panel D can be positioned anywhere over a longer arc. A consequential change will need to be made in the dimensions and rate of the spring 39 of support member 13 and the corresponding spring in support member 14.

The invention claimed is:

1. A display panel mounting unit comprising a mounting plate and at least two mounting supports;

the mounting plate providing for the attachment of the unit to a wall or other support and for the attachment of a display panel to the mounting plate by way of the mounting supports; the mounting plate including first and second support flanges;

each mounting support comprising:

a first longitudinal member incorporating means whereby the member can be attached to the display panel for mounting; and a second longitudinal member pivotably attached to the first by a pivot so as to provide an axis of rotation of the second member relative to the first member; the second member comprising:

a first arm on one side of the pivot and a second arm on the other side of the pivot;

the first arm having at, or near, an end remote from the pivot an anchorage and a first means for retaining the mounting support on the first support flange on the mounting plate;

the second arm having at, or near, an end remote from the pivot a second means for retaining the mounting support on the second support flange on the mounting plate;

a compression means extending between a location on the first member and the anchorage; the compression means serving to resiliently bias the anchorage, and so the end of the second arm remote from the pivot, away from the first member; the compression means providing that with a combination comprising a display panel secured to the first longitudinal members attached to the second member by means of the pivot and, the second member clamped to the mounting plate then a first moment generated by the weight of the combination about the pivot axis in a given direction of rotation is balanced by a second moment generated by the action of the compression means on the first arm about the pivot axis in the opposite direction to the given direction.

2. The panel mounting unit according to claim 1, wherein the means whereby the first longitudinal member can be attached to the display panel for mounting comprises at least one longitudinal slot in the first longitudinal member.

3. The display panel mounting unit according to claim 2, wherein each slot is provided with an associated clip mounting by which a bolt can be positioned in a predetermined location in the slot.

4. The display panel according to claim 3, wherein the slot is provided with a series of recesses at intervals along its length and the associated clip is provided with a projection whereby the clip can engage with a selected recess in the series to locate the clip at a predetermined position relative to a display panel for mounting on the first member.

5. An mounting unit according to claim 1 including means whereby the first member can be displaced about the axis of rotation relative to the second member by means operable remotely from the unit.

6. An assembly comprising in combination a display panel and a display panel mounting comprising a mounting plate and at least two mounting supports;

the mounting plate providing for the attachment of the unit to a wall or other support and for the attachment of a display panel to the mounting plate by way of the mounting supports; the mounting plate including first and second support flanges;

each mounting support comprising:

a first longitudinal member incorporating means whereby the member can be attached to the display panel for mounting; and a second longitudinal member pivotably attached to the first by means of a pivot so as to provide an axis of rotation of the second member relative to the first member; the second member comprising a first arm on one side of the pivot and a second arm on the other side of the pivot;

the first arm having at, or near, an end remote from the pivot an anchorage and a first means for retaining the mounting support on the first support flange on the mounting plate;

the second arm having at, or near, an end remote from the pivot a second means for retaining the mounting support on the second support flange on the mounting plate;

a compression means extending between a location on the first member and the anchorage; the compression means serving to resiliently bias the anchorage, and so the end of the second arm remote from the pivot, away from the first member; the compression means providing that with a combination comprising a display panel secured to the first longitudinal members attached to the second member by means of the pivot and the second member clamped to the mounting plate then a first moment generated by the weight of the combination about the pivot axis in a given direction of rotation is balanced by a second moment generated by the action of the compression means on the first arm about the pivot axis in the opposite direction to the given direction.

7. An assembly according to claim 6 including means whereby the first member can be displaced about the axis of rotation relative to the second member by means operable remotely from the unit.

* * * * *